United States Patent [19]

Nakajima

[11] Patent Number: 4,794,823

[45] Date of Patent: Jan. 3, 1989

[54] TIRE CHAIN MOUNT

[76] Inventor: Akiko Nakajima, No. 47-15, Matsugaoka 3-chome, Funabashi-shi, Chiba-ken, Japan

[21] Appl. No.: 112,097

[22] Filed: Oct. 22, 1987

[51] Int. Cl.⁴ ............................................. B60C 27/06
[52] U.S. Cl. ..................................... 81/15.8; 29/429; 152/213 R
[58] Field of Search .................... 81/15.8; 29/428, 429; 152/213 R, 213 A, 230

[56] References Cited

U.S. PATENT DOCUMENTS

| 2,100,819 | 11/1937 | Salley  | 81/15.8 |
| 2,159,626 | 5/1939  | Boycott | 81/15.8 |
| 2,175,395 | 10/1939 | Hewel   | 81/15.8 |
| 2,576,302 | 11/1951 | Lutz    | 81/15.8 |
| 2,665,602 | 1/1954  | Kent    | 81/15.8 |
| 4,703,675 | 11/1987 | Dalaba  | 81/15.8 |

Primary Examiner—Roscoe V. Parker
Attorney, Agent, or Firm—Henry C. Nields

[57] ABSTRACT

An inventive tire chain mounting device includes a pair of spacedly opposite arms, each arm having a lug and a clamping surface, the lug capable of engaging a tire chain and the clamping surface being provided on one end of the arm and capable of being contact with a side of a tire; a plurality of resilient bars connecting the arms, the bars sliding along one another so as to adjust a spacing between the clamping surface and exerting a resilient force reducing the spacing; and a member preventing the bars from sliding along one another. A method for mounting the inventive tire chain mounting device onto a tire is disclosed. The tire chain mounting device can quickly mount tire chains onto an automotive tire.

8 Claims, 3 Drawing Sheets

TIRE CHAIN MOUNT

BACKGROUND OF THE INVENTION

1. Field of the Invention

This invention relates to a tire chain mounting device and a method therefor used with an automotive vehicle traveling on a snow road.

2. Description of the Prior Art

It is very difficult and troublesome to mount a tire chain onto a tire of the automotive vehicle. In particular, winding the tire chain round an outer periphery of the tire is most troublesome. Hithertofore, various types of tire chain mounting device have been developed which have a pair of fixedly spaced arms for transversely and elastically clamping the opposite side portions of the tire tread and have a lug on each arm for engaging a second ring from an end of the tire chain. These types of tire chain mounting device can readily and promptly wind the tire chain round the outer periphery of the tire by means of turning the tire once along a road.

However, a breadth of the tire of the automotive vehicle includes more than about 35 classes in accordance with JIS, e.g. ranging from a class of about 130 mm to a class above 209 mm and one tire chain mounting device of the above-described types can be used with only one class of tire breadth because the above-described types of tire chain mounting device have the fixedly spaced arms. Therefore, when a person has more than one automotive vehicles one having a set of tires with a tire breadth different from a tire breadth of a set of tires of other automotive vehicles, or when a tire breadth is changed by a replacement of a set of tires for the same automotive vehicle, he must provide different tire chain mounting devices for at least two classes of tire breadth.

In order to overcome the above-described disadvantage, some types of tire chain mounting device have been developed which can adjust a spacing between a pair of opposite arms in accordance with various classes of tire breadth. For example, JP-Y-56-46936 or JP-U-60-47607 discloses such type of tire chain mounting device.

JP-Y-56-46936 discloses a tire chain mounting device comprising a pair of opposite arms for clamping the opposite side walls of a tire; two lugs for engaging a part of a tire chain, each lug integrally formed with each arm; a pair of rigid bars extending perpendicularly to an axis of one arm from an end of the arm to an end of the other arm; a member for fixing the bars overlapping each other in a range of a preadjusted length; and a plurality of gauge marks for indicating specific spacings between the opposite arms produced by means of overlapping the bars.

According to this tire chain mounting device, the bars must be rigid because they continuously mesh each other by means of their rack teeth. The rigidity of the overlapped bars blocks flexibility in the spacing between the opposite arms once the spacing has been fixed. When a person mounts the tire chain mounting device onto the tire, he must usually check a gauge mark of the tire breadth provided on the side wall of the tire and select a corresponding gauge mark on the tire chain mounting device in order to adjust the spacing between the arms. In other words, he cannot adjust the spacing between the arms in accordance with a tire tread breadth (somewhat narrower than the tire breadth between the tire side walls) by means of bringing the arms into contact directly with the opposite edges of the tire tread. Consequently, a clamping force of the arms produced by only an elastic force of the arm is small and thereby the tire chain mounting device is inclined to detach from the tire.

SUMMARY OF THE INVENTION

A primary ofject if this invention is to provide a novel tire chain mounting device by means of which a person can mount tire chains onto tires of various breadths between tire side walls. In order to achieve the above-described object, the inventive tire chain mounting device comprising a pair of spacedly opposite arms, each arm having a lug and a clamping surface, the lug capable of engaging a tire chain and the clamping surface being provided on one end of the arm and capable of being contact with a side of a tire; a plurality of resilient bars connecting the arms, the bars sliding along one another so as to adjust a spacing between the clamping surfaces and exerting a resilient force reducing the spacing; and means for preventing the bars from sliding along one another.

Another ofject of this invention is to provide a novel method for mounting a tire-chain-mounting device onto a tire, this device comprising: a pair of spacedly opposite arms, each arm having a lug and a clamping surface, the lug capable of engaging a tire chain and the clamping surface being provided on one end of the arm and capable of being contact with a side of the tire; a resilient bar connecting the other ends of the arms so as to adjust a spacing between the other ends of the arms, the bar exerting a resilient force reducing a spacing between the clamping surfaces; and means for fixing the spacing between the other ends of the arms, the method comprising the steps of: adjusting the spacing between the clamping surfaces in accordance with a breadth of a tire tread without exerting the resilient force the bar; fixing the spacing between the other ends of the arms while maintaining the adjusted spacing in accordance with a breadth between opposite side walls of the tire against the resilient force of the bar; and bringing the clamping surfaces into contact with the side walls of the tire by means of the resilient force of the bar.

The preferred embodiments of this invention will be hereinafter described with reference to FIGS. 1 to 3.

DESCRIPTION OF THE PREFERRED EMBODIMENTS

Figure 1:
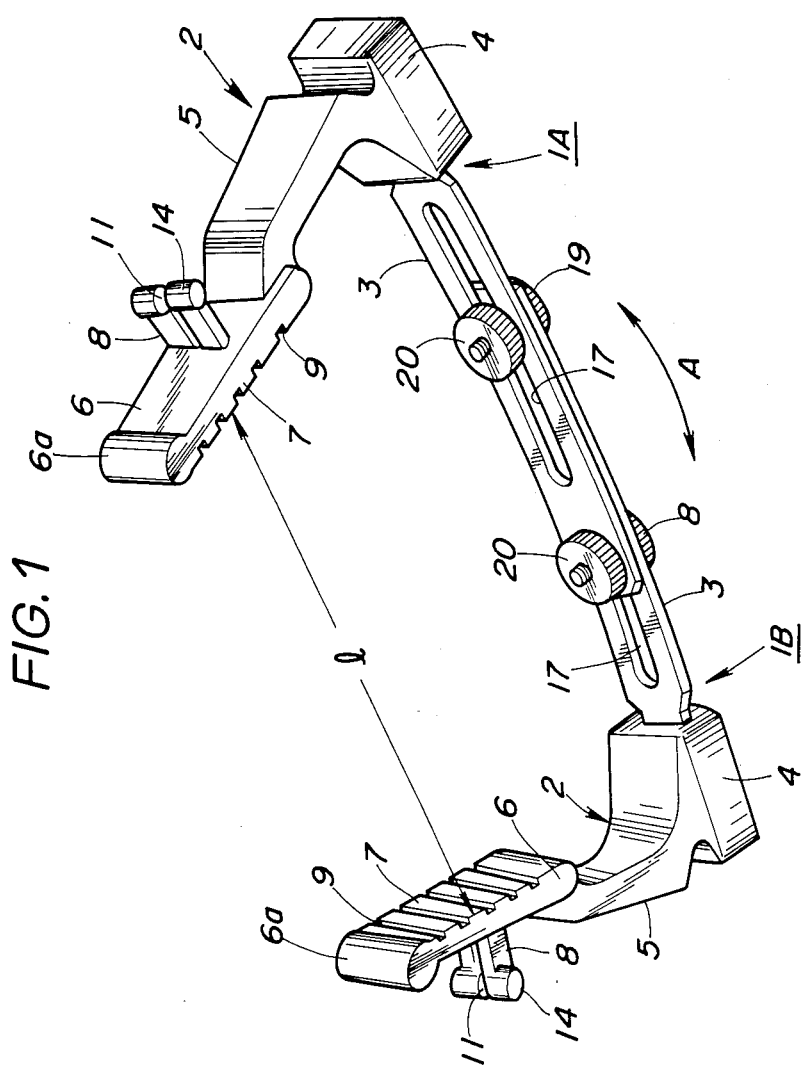
FIG. 1 is a perspective view of a tire chain mounting according to an embodiment of this invention.
Figure 2:
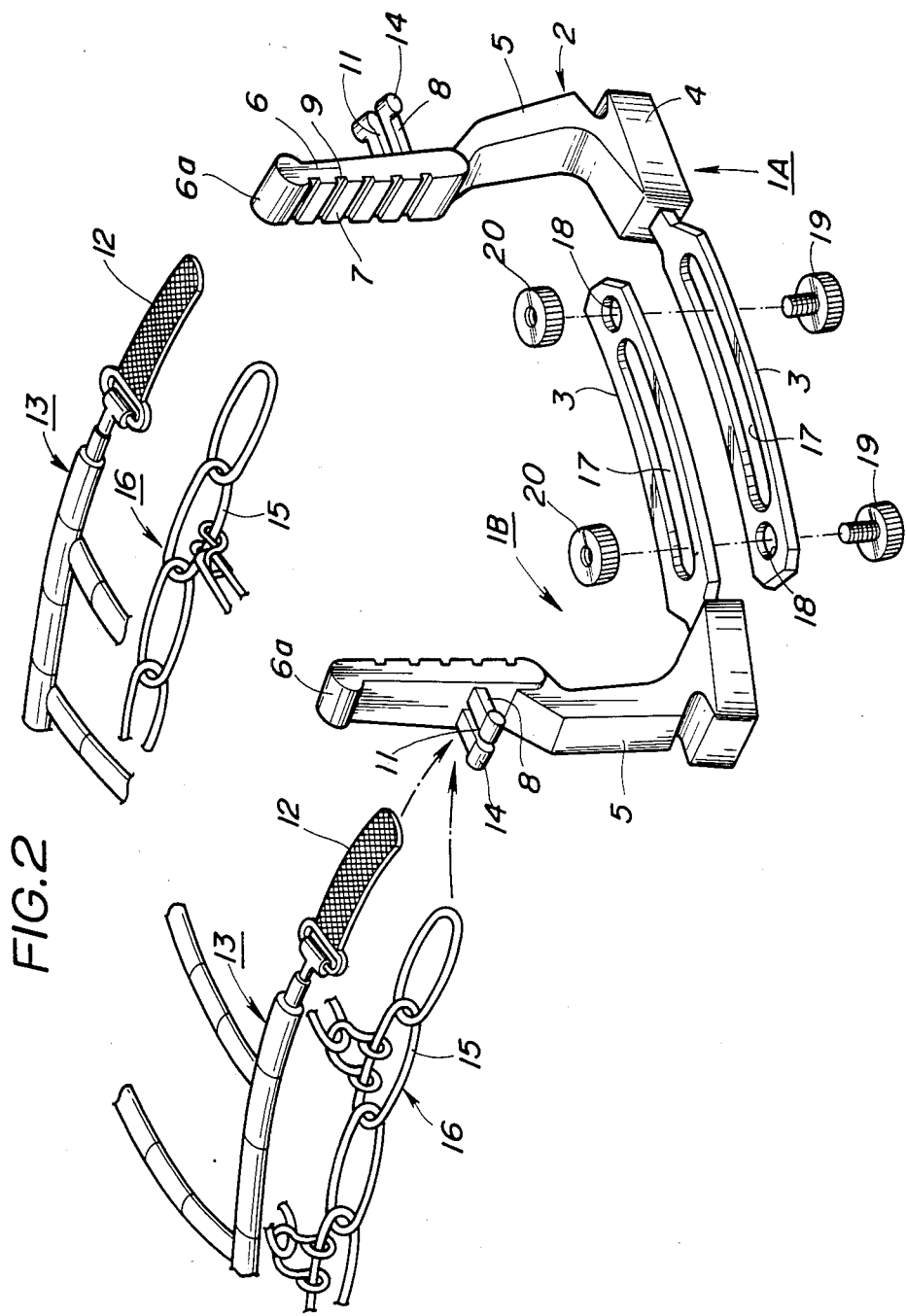
FIG. 2 is an exploded perspective view of the tire mounting device of FIG. 1.
Figure 3:
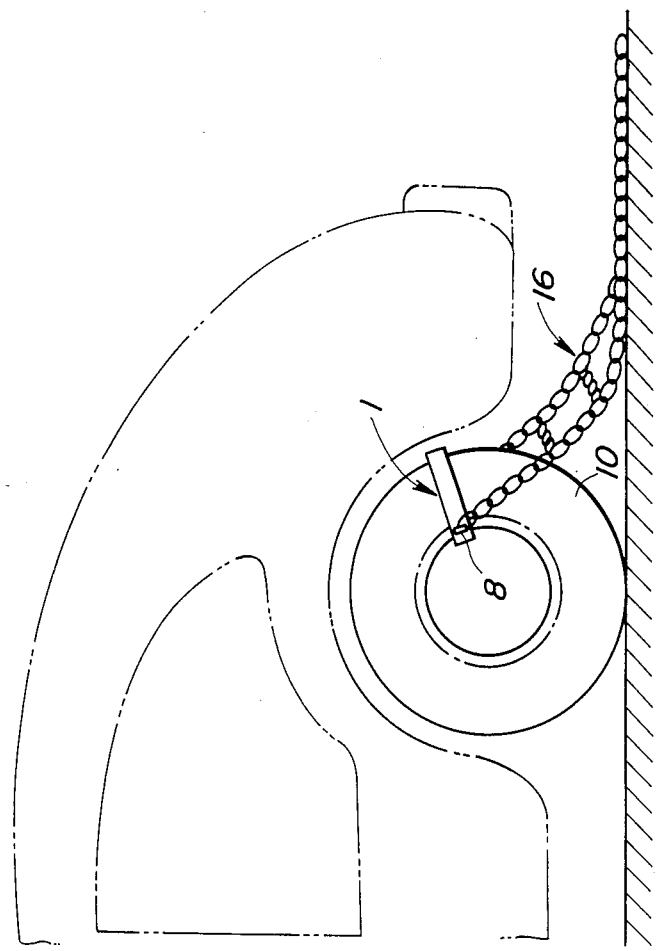
FIG. 3 is an illustration for a tire chain mounting by means of the tire chain mounting device of FIG. 1.

As shown in FIGS. 1 and 2, a tire chain mounting device I according to a first embodiment of this invention includes a pair of clamp elements 1A and 1B. The clamp elements 1A and 1B have essentially the same structure. Therefore, the clamp element 1A will be hereinafter described. As best shown in FIG. 2, the clamp element 1A includes an arm 2 made of synthetic resin, e.g., nylon and a connecting bar 3 made of a resilient metal, e.g., a normal steel or stainless steel. The arm 2 includes a block-like base 4, a stem 5 connected to the base 4 and having a finger 6 with a clamping surface 7 for being in contact with a side of the tire 10, and a lug 8 extending rearwardly from the finger 6 in an opposite direction of the clamping surface 7. The clamping surface 7 has a plurality of grooves 9 horizontally and in parallel arranged. The grooves 9 prevent the clamp element 1A from sliding along a side of the tire 10. The lug 8 includes an axial slit 11 for receiving a belt 12 provided at an end of a cable chain 13. A free end of the lug 8 has a stop 14 projecting transversely with the axis of the lug 8. The stop 14 prevents an engaged ring 15 from an end of a tire chain 16 from disengaging from the lug 8.

The connecting bar 3 may be, e.g., a convex plate projecting in an opposite direction to an extention of the arm 2 and a slot 17 extending axially of the connecting bar 3. A free end of the connecting bar 3 includes a hole 18 through which a bolt 19 passes. The bolt 19 also passes through a slot 17 in the other connecting bar 3. The other end of the connecting bar 3 is securely embeded in the base 4 of the arm 2. The thickness, breadth and hardness of quenching of the connecting bar 3 are so determined as to exhibit a suitable resilient force when two connecting bars 3 are overlapped on and connected with each other, in particular, when the overlapped portions extend almost along a full length of the connecting bar 3. A free end of the connecting bar 3 includes a hole 18 adjacent one edge of the slot 17. The bolt 19 passes through the hole 18 and also a slot 17 in the other in order to engage a nut 20. When the connecting bars 3 slide along each other in order to adjust a spacing 1 between the clamping surfaces 7, the bolt 19 and the nut 20 of the clamp element 1A free to move within the slot 17 of the clamp element 1B together with the connecting bar 3 of the clamp element 1A. Therefore, when the clamp elements 1A and 1B move, the pair of combinations of a bolt 19 and a nut 20 move in a relationship of a mirror image towards each other. This facilitates a tightening operation both the combinations of the bolt 19 and the nut 20 and firmly supports the opposite tires 10 when the heads of the bolts 19 is in contact with a road surface by the turning of the tires 10.

An operation of the tire chain mounting device 1 will be described hereinafter. The clamp elements 1A and 1B are interconnected so that two mating connecting bars 3 are overlapped on each other and a pair of combinations of a bolt 19 and a nut 20 loosely fit a slot 17 and a hole 18. The clamp elements 1A and 1B can be freely slided in order to adjust a spacing 1 between the clamping surfaces 7 of the arms 2. A person first brings two free ends 6a of the opposite fingers 6 into contact with the outer periphery of the tire tread and adjust the spacing 1 in accordance with a breadth between the opposite edges of the tire tread. In this state, both the combinations of the bolt 19 and the nut 20 are fastened. The two second rings 15 of the tire chain 16 are engaged with the opposite lugs 8 or the two belts 12 of the cable chain 13 are inserted into the slits 11. The person may bring the opposite fingers 6 out of contact with the opposite edges of the outer periphery of the tire tread. Then, the person engages the two second rings 15 of the tire chain 16 with the opposite lugs 8 or inserts the two belts 12 of the cable chain 13 into the slits 11.

Then, the person grips the opposite arms 2 and expands the spacing 1 in order to pass the opposite clamping surfaces 7 past the tire tread and bring them into contact with the sides of the tire 10. The resilient force of the connecting bars 3 continuously presses the arms 2 onto the sides of the tire 10 and prevents the arms 2 from detaching from the sides of the tire 10. The person can wind the tire chain 16 or cable chain 13 around the outer periphery of the tire 10 by means of turning the tire 10 once along a road. When the tire chain mounting device 1 returns to a start point, the person disengages the second rings 15 or the belts 12 from the lugs 8 of the tire chain mounting device I and detaches the tire chain mounting device I from the tire 10. Then, the person connects the second rings 15 or the belts 12 with mating hooks or buckles provided on the other end of the tire chain 16 or the cable chain 13.

Alternatively, a need for either of the holes 18 may be eliminated. In this case, either of the combinations of the bolt 19 and the nut 20 can be selectively located within the slots 17 when the one combination of the bolt 19 and the nut 20 is fixed.

Alternatively, a need for both the holes 18 may be eliminated.

Alternatively, a plurality of slots or circular holes may be provided along the axis of the connecting bars 3. These slots extend along the axis of the connecting bars 3.

Alternatively, each bolt may be integrally formed with the connecting bar. In this case, the connecting bar has no holes which the bolt passes through.

In the first embodiment, the resilient force of the combination of the connecting bars should be so strong that a person can expand the spacing between the clamping surfaces even when the connecting bars fully overlap each other.

What is claimed is:

1. A tire chain mounting device, comprising: a pair of spacedly opposite arms, each arm having a lug and a clamping surface, the lug capable of engaging a tire chain and the clamping surface being provided on one end of the arm and capable of being contact with a side of a tire; a plurality of resilient bars connecting the arms, the bars sliding along one another so as to adjust a spacing between the clamping surfaces; and means for preventing the bars from sliding along one another; wherein each arm has one end which is free and includes the clamping surface, the other end of each arm being connected to one end of each bar, and wherein the bars are arc-shaped so as to project in a direction far from the clamping surface; wherein the bars consist of two bars each including an axially extending slot, the slots in the bars overlapping each other when the bars overlap each other, and wherein said preventing means includes a unit of a bolt and a nut, the bolt passing through at least one slot.

2. A tire chain mounting device as recited in claim 1, wherein each bar includes a hole which the bolt passes through near the other end thereof, the hole being in alignment with the slot.

3. A tire chain mounting device as recited in claim 2, wherein each bar has substantially an equal length and each slot and hole are positioned symmetrically with the others when the bars overlap each other.

4. A tire chain mounting device as recited in claim 1, wherein the lug includes an opening extending along an axis of the lug.

5. A tire chain mounting device as recited in claim 1, wherein the arms are made of synthetic resin and the bars are made of metal.

6. A tire chain mounting device, comprising:

a pair of clamp elements, each clamp element including one arm and one connecting bar, the arm including a lug capable of engaging a tire chain and the arm including one end with a clamping surface capable of being contact with a side of a tire, the connecting bar capable of being in contact with a tread of the tire and one end of the connecting bar being secured to the other end of the arm; and a pair of bolt and nut units; and wherein the connecting bar is made of an arc-shaped resilient plate, and projects in a direction far from the clamping surface, the connecting bar including an axially extending slot and a hole which a bolt of the bolt and nut units passes through closer to the other end of the connecting bar than the slot, the hole in one connecting bar overlapping the slot in the other connecting bar when the connecting bars overlaps each other; and wherein the bolt passing through the hole in the one connecting bar also passes through the slot in the other connecting bar, the bolt engaging a nut of the bolt and nut units in order to fix the connecting bars to each other or loosen them from each other.

7. A clamp element, comprising:

an arm including a lug capable of engaging a tire chain, the arm including one end with a clmaping surface capable of being contact with a side of a tire; and a resilient bar having one end secured to the other end of the arm, the bar extending transversely with an axis of the arm and including an axially extending slot and a hole in alignment with the slot and near the other end of the bar.

8. A method for mounting a tire-chain-mounting-device onto a tire, the device comprising: a pair of spacedly opposite arms, each arm having a lug and a clamping surface, the lug capable of engaging a tire chain and the clamping surface being provided on one end of the arm and capable of being contact with a side of a tire; a resilient bar connecting the other ends of the arms so as to adjust a spacing between the other ends of the arms, the bar exerting a resilient force reducing a spacing between the clamping surfaces; and means for fixing the spacing between the other ends of the arms, the method compring the steps of:

adjusting the spacing between the clamping surfaces in accordance with a breadth of a tire tread without exerting the resilient force of the bar;

fixing the spacing between the other ends of the arms while maintaining the adjusted spacing between the clamping surfaces;

expanding the adjusted spacing between the clamping surfaces in accordance with a breadth between opposite side walls of the tire against the resilient force of the bar; and bringing the clamping surfaces into contact with the side walls of the tire by means of the resilient force of the bar.

* * * * *